(12) United States Patent
Wittrisch et al.

(10) Patent No.: US 10,180,127 B2
(45) Date of Patent: Jan. 15, 2019

(54) FLOATING OFFSHORE WIND TURBINE COMPRISING AN ACTIVE NACELLE TILT STABILIZATION SYSTEM

(75) Inventors: Christian Wittrisch, Rueil Malmaison (FR); Pascal Longuemare, Saint Germain en Laye (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 774 days.

(21) Appl. No.: 13/996,702

(22) PCT Filed: Dec. 14, 2011

(86) PCT No.: PCT/FR2011/000649
§ 371 (c)(1),
(2), (4) Date: Jul. 26, 2013

(87) PCT Pub. No.: WO2012/085351
PCT Pub. Date: Jun. 28, 2012

(65) Prior Publication Data
US 2013/0302139 A1    Nov. 14, 2013

(30) Foreign Application Priority Data
Dec. 23, 2010 (FR) .................... 10 05063

(51) Int. Cl.
*F03D 7/04* (2006.01)
*F03D 7/02* (2006.01)
(Continued)

(52) U.S. Cl.
CPC ............ *F03D 7/04* (2013.01); *F03D 7/0204* (2013.01); *F03D 13/25* (2016.05);
(Continued)

(58) Field of Classification Search
CPC ........ F03D 7/04; F03D 7/0204; F03D 7/0216; F03D 7/042; F03D 11/04; F05B 2240/93;
(Continued)

(56) References Cited

U.S. PATENT DOCUMENTS

| 6,327,957 B1 | 12/2001 | Carter, Sr. | |
| 7,156,037 B2* | 1/2007 | Borgen | E02D 27/42 114/264 |
| 2004/0076518 A1* | 4/2004 | Drake | F03D 1/00 416/10 |

(Continued)

FOREIGN PATENT DOCUMENTS

| CH | 695 790 A5 | 1/2002 | |
| CH | 695790 A5 * | 8/2006 | ........... F03D 7/0204 |

(Continued)

*Primary Examiner* — David E Sosnowski
*Assistant Examiner* — Juan G Flores
(74) *Attorney, Agent, or Firm* — Fitch, Even, Tabin & Flannery LLP

(57) ABSTRACT

The present invention relates to a wind turbine comprising a nacelle (1) installed on a tower (2) supported by a floating support. The nacelle is articulated with respect to the tower in a vertical plane, and it comprises means (12, 16) for correcting the nacelle tilt, means for automatically adjusting the correction means in accordance with sensors detecting the correction values, the adjustment means being synchronous with the movements of the floating support.

Figure 4 to be published.

3 Claims, 4 Drawing Sheets

(51) Int. Cl.
*F03D 13/25* (2016.01)
*B63B 17/00* (2006.01)
*B63B 35/44* (2006.01)

(52) U.S. Cl.
CPC . *B63B 2017/0072* (2013.01); *B63B 2035/446* (2013.01); *F05B 2240/14* (2013.01); *F05B 2240/93* (2013.01); *F05B 2240/95* (2013.01); *F05B 2270/404* (2013.01); *F05B 2270/602* (2013.01); *F05B 2270/604* (2013.01); *F05B 2270/606* (2013.01); *Y02E 10/723* (2013.01); *Y02E 10/727* (2013.01)

(58) Field of Classification Search
CPC . F05B 2240/95; F05B 2240/96; Y02E 10/727
See application file for complete search history.

(56) References Cited

U.S. PATENT DOCUMENTS

2006/0159550 A1\* 7/2006 Nagao .................. F01D 1/30
416/132 B

FOREIGN PATENT DOCUMENTS

| | | | |
|---|---|---|---|
| EP | 1 683 965 A2 | 7/2006 | |
| EP | 2 171 271 B1 | 9/2010 | |
| JP | 2010-196591 | 9/2010 | |
| WO | WO 03/098038 A1 | 11/2003 | |
| WO | WO 2009/003860 A1 | 1/2009 | |
| WO | WO 2009131826 A2 \* | 10/2009 | ............. B63B 21/50 |
| WO | WO 2010/098814 A1 | 9/2010 | |
| WO | WO 2010098814 A1 \* | 9/2010 | ............. F03D 11/04 |

\* cited by examiner

FLOATING OFFSHORE WIND TURBINE COMPRISING AN ACTIVE NACELLE TILT STABILIZATION SYSTEM

FIELD OF THE INVENTION

The object of the present invention relates to offshore wind turbines on floating supports, and more particularly to systems for maintaining the axis of rotation of the blades in an imposed direction with respect to the real direction of the wind, for all the movements of the wind turbine support, i.e. the tower and its floating support.

BACKGROUND OF THE INVENTION

In the case of a standard wind turbine, the nacelle can carry three blades (approximately 60 m in length for example) fastened to a rotor that drives, through the agency of a gear reducer, an electric generator and accessories such as the blade orientation system, electric transformers, a hydraulic system, the ventilation. The structure of the nacelle rests on a slewing ring itself supported by the tower.

The nacelle is permanently oriented on the azimuth axis so that the rotation plane of the blades faces the wind. The nacelle is therefore mobile in rotation with respect to the axis of the tower, by means of one (or more) motor-driven gears cooperating with a ring gear. The overall weight of a nacelle can be of the order of 200 to 300 tons.

The tower supporting the nacelle, approximately 100 m in height, rests on a floating support held in position and substantially stabilized by tendons in case of water depths greater than 100 m.

The nacelle of the wind turbine undergoes many forces and stresses related to the wind speed, which results in a thrust on the blades supported by a thrust bearing whose mobile part is secured to the rotor shaft.

The value of this thrust power, or axial force, oriented in the wind direction, depends on the angle (pitch) of each blade with respect to the wind direction.

In the case of a wind turbine on a floating support, the floating support undergoes various forces due to the combined effects of the wind, the waves, the ocean currents, the tendons, the effects of the tower on the floating support, its tilt and flexion by the applied forces due to the wind and the nacelle.

The "wind turbine on floating support" system undergoes a set of complex forces acting in different directions, having different values, static, periodic, aperiodic. These forces, linked and interdependent, result from the effects of the wind on the blades and the nacelle, the tower, the floating support, the tendons and from the effects of the wind, the waves and the currents on this floating support.

It is the wind direction that imposes the direction of the axial force applied onto the rotor since the rotation plane of the blades must be permanently oriented perpendicular to the wind direction in order to obtain maximum wind energy absorption for a higher efficiency.

The wind direction in space can be defined by two angles:—the tilt angle of the wind direction with respect to the horizontal plane taken as the reference and—the azimuth angle formed, in the same horizontal plane, by the wind direction with the direction of the Earth's magnetic field taken as the reference.

The conventional wind turbines currently used onshore or offshore on a fixed or floating support comprise a nacelle rotationally mobile about the tower axis that can be oriented on the azimuth axis. However, no wind turbine comprises active means for controlling the nacelle tilt with respect to the horizontal reference depending on the periodic displacements due to the buoyancy of the support, or on the wind direction variations.

SUMMARY OF THE INVENTION

The present invention thus relates to a wind turbine comprising a nacelle installed on a tower supported by a floating support, characterized in that the nacelle is articulated with respect to said tower in a vertical plane, and in that it comprises means for correcting the nacelle tilt, means for automatically adjusting said correction means in accordance with sensors detecting the correction values, said adjustment means being synchronous with the movements of the floating support.

The nacelle can be articulated and suspended from a horizontal shaft.

The nacelle can be articulated and rest on a horizontal shaft in a precariously balanced position.

The nacelle can be articulated around a horizontal shaft and rest on a thrust in a circular sector centered on the axis of said shaft.

The nacelle can comprise a mass transfer system so as to shift the center of gravity of the suspended assembly.

A mass can be transferred on a slide.

A liquid mass can be transferred by pumping.

The circular sector can comprise a toothed system cooperating with a motorized pinion according to the automatic adjustment means.

The nacelle can comprise articulation point displacement means for shifting the center of gravity of the suspended assembly with respect to the tower.

BRIEF DESCRIPTION OF THE FIGURES

Other features and advantages of the invention will be clear from reading the description hereafter of non-limitative examples, with reference to the accompanying figures wherein.

DETAILED DESCRIPTION

The object of the present invention relates to the active stabilization of a wind turbine nacelle by means of actuators for maintaining it permanently oriented along the real axis of the wind defined in terms of tilt and azimuth.

The nacelle is secured to the tower and to its support. Therefore, the orientation of the nacelle along the real axis of the wind is required for all tower tilt and azimuth angles and for all periodic or aperiodic movements of variable amplitudes, movements related to the tower flexibility and to the displacement of its support, in particular a floating support.

Figure 1:
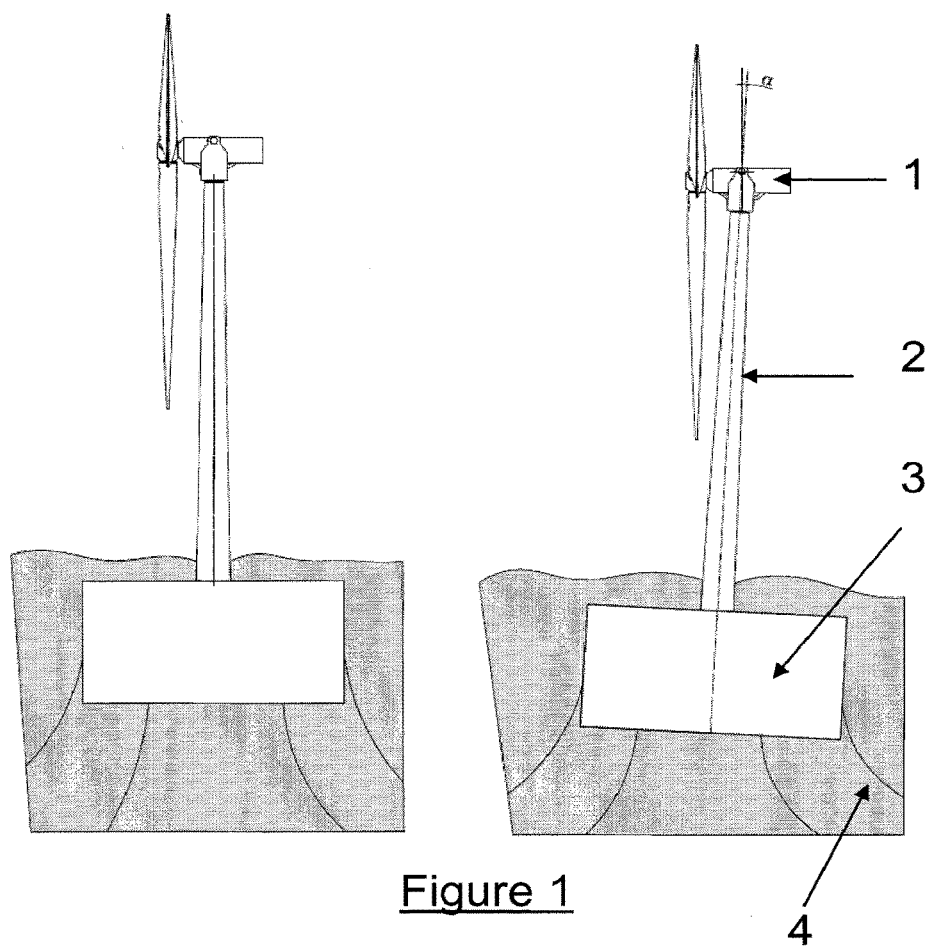
FIG. 1 diagrammatically shows an offshore wind turbine.

FIG. 1 diagrammatically shows an offshore wind turbine whose nacelle 1 carried by tower 2 oscillates at an angle α depending on the oscillation of floating support 3 moored by tendons 4. The object of the present invention is to provide the nacelle with a system for continuous correction of the rotation plane of the blades carried by the nacelle as a function of the oscillations of the floating support or of the flexions of the tower.

Figure 2:
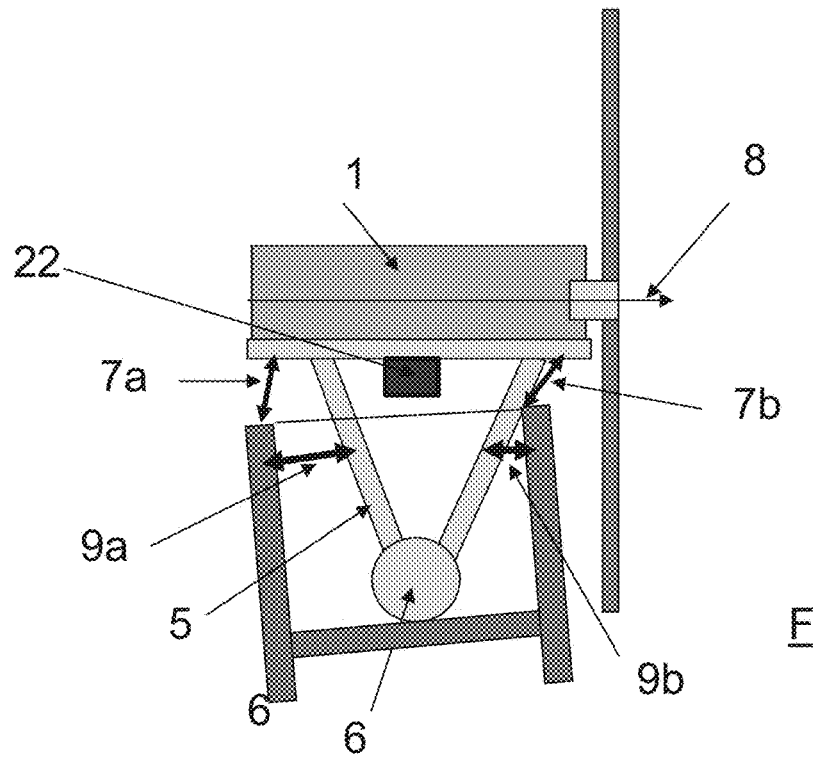
FIGS. 2 and 3 diagrammatically show the principle of two embodiments of the invention.
Figure 3:
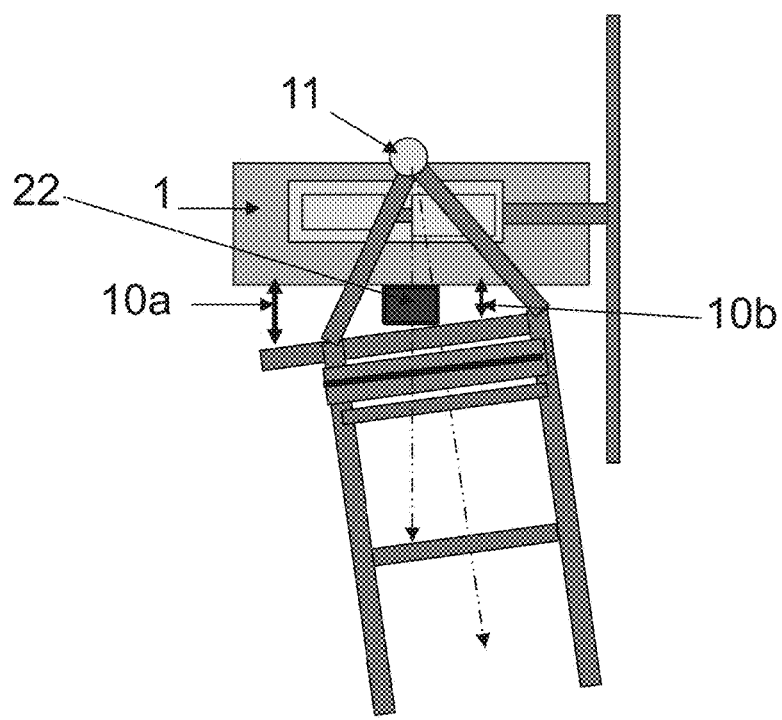

FIGS. 2 and 3 diagrammatically show two embodiments in their principle.

FIG. 2 shows the inverted pendulum principle, nacelle 1 being supported by a cradle 5 precariously positioned on a rotating shaft 6 arranged beneath the center of gravity of the mobile assembly, i.e. the nacelle and the cradle. Activation means 7a and 7b, or 9a and 9b, shown by arrows, control the position of axis 8 of the nacelle with respect to a reference.

FIG. 3 shows the principle of the inverted pendulum, or swing, where the nacelle is suspended from an upper rotating shaft 11. Activation means 10a and 10b shown by arrows control the position of axis 8 of the nacelle with respect to a reference.

For these two principles, the activation means are suited to act dynamically for stabilizing the nacelle so as to perform corrections synchronized with the oscillation frequency.

The reference directions, tilt and azimuth with respect to the horizontal and the magnetic north respectively, are given by conventional sensors 22. Furthermore, other measuring sensors of 3-axis inclinometer and accelerometer type arranged on the mobile part (nacelle) and the oscillating support (tower), the wind vane, or measuring sensors using laser beams for detecting the wind direction, for measuring the wind speed, the temperature and the pressure, are coupled with the system for automatically controlling the means activating the static or dynamic stabilization of the nacelle with respect to the tower.

Figure 4:
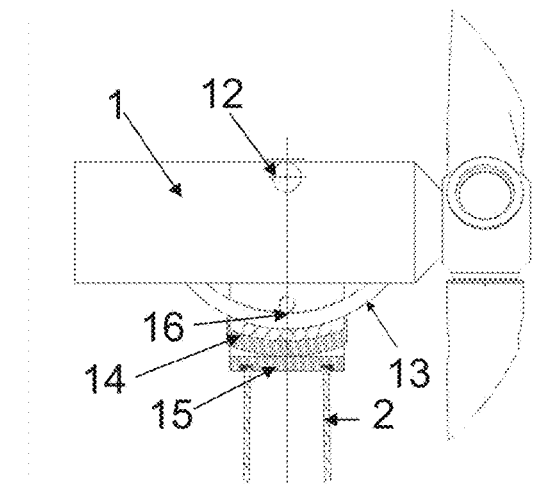
FIG. 4 shows the principle of the articulated nacelle supported by the base thereof, FIGS. 5 and 6 diagrammatically show the balancing mass transfer, FIGS. 7 and 8 diagrammatically show the means for shifting the center of gravity of the suspended assembly.

FIG. 4 shows another embodiment whose principle is similar to that of a nacelle suspended from a rotating shaft, but it is completed by a support below the nacelle, which allows to better distribute loads and thus to take up the weight of the nacelle without entirely relying on rotating shaft 12.

In FIG. 4, the nacelle is held by a shaft 12 allowing tilt adjustment. A crown portion 13 secured to the nacelle rests on a crown portion 14 secured to the end of tower 2 through the agency of an azimuth-orientation crown 15. Rollers inserted between the two crowns allow relative displacement between the two crowns in case of a tilt variation while taking up the compressive stresses due to the weight of the nacelle and of the blades. Crown 13 linked to the nacelle comprises gear teeth for cooperating with a motorized pinion 16. In this embodiment, the rotating shaft no longer bears all of the loads.

Of course, other mechanical means known to the person skilled in the art can be used for rotating the mobile part with respect to the fixed part.

Concerning the pendular embodiment, two stabilization systems can be considered, coupled or used simultaneously:

"static" stabilization means using the principle of balancing the weight of the nacelle subjected to various applied forces, such as the effect of the wind thrust on the blades. This static stabilization uses the effect of the gravity force on a pendulum. In addition, adaptive systems can move the center of gravity of the nacelle so as to either compensate for variable external forces (wind, gyroscopic effects, etc.) or to allow to have a sufficiently fast response time of the automatic adjustment system.

Figure 5:
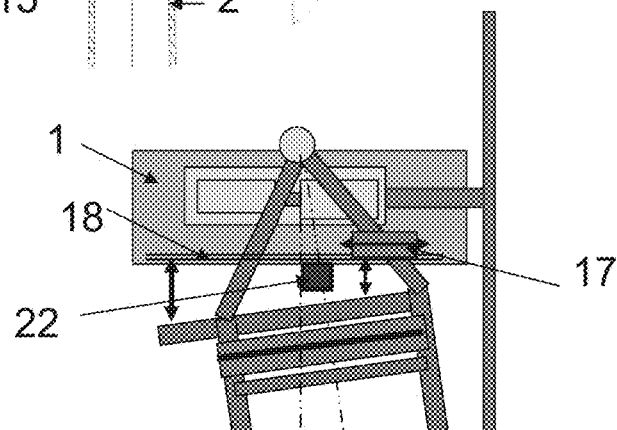
Figure 6:
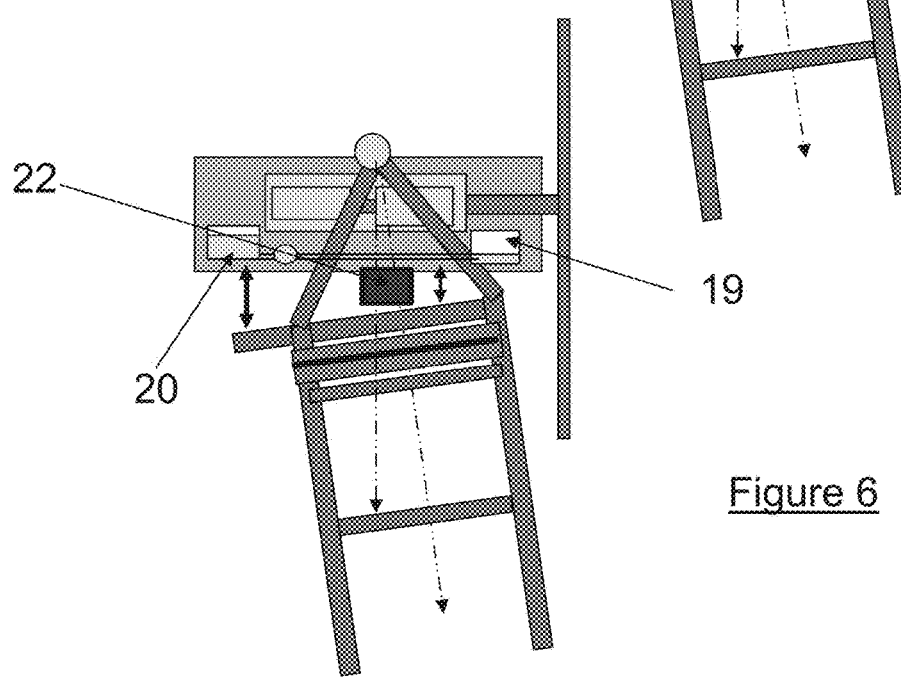

FIGS. 5 and 6 illustrate two so-called "static" stabilization means. FIG. 5 shows the transfer of a mass 17 linked to nacelle 1, on a rail or equivalent 18. This mass modifies the position of the center of gravity with respect to the axis of the rotating shaft, which provides a lever arm that develops a restoring torque. The frequency of the displacement of balancing mass 17 thus is substantially of the same order as the frequency of the oscillations to be compensated for. FIG. 6 relates to the same principle, but the transferred mass is a volume of liquid displaced through pumping between two tanks 19 and 20.

Figure 7:
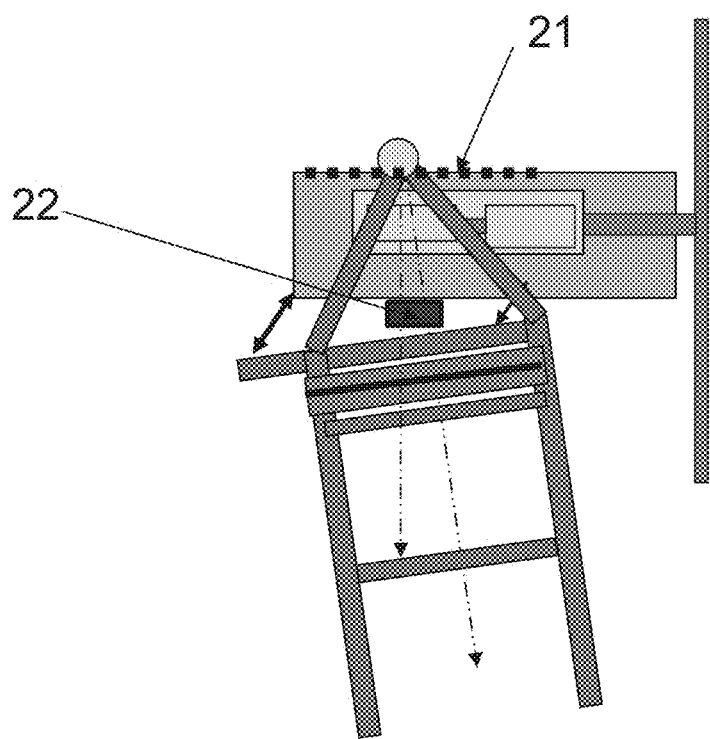
Figure 8:
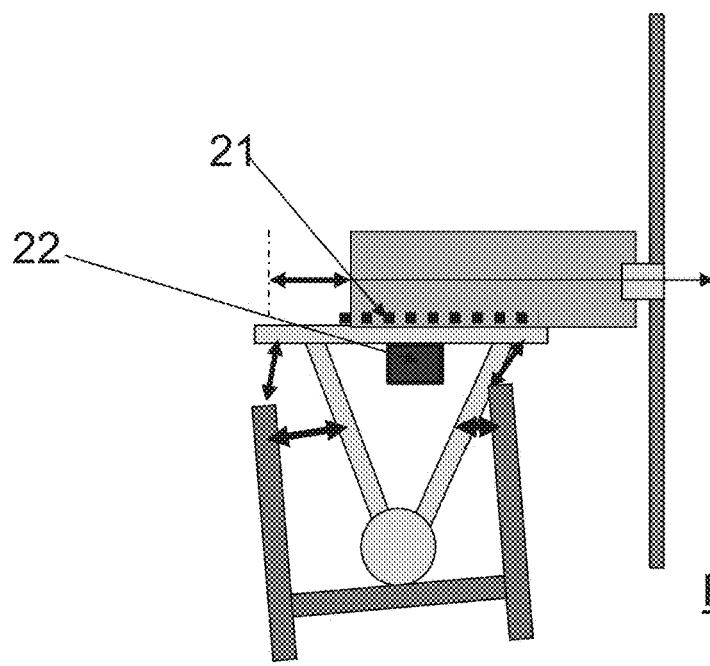

FIGS. 7 and 8 show the principle wherein the suspended assembly, nacelle and blades, moves on a rail 21 along an axis parallel to the rotor, with respect to the axis of rotation related to the tower. The displacement of the nacelle along this axis moves the center of gravity with respect to the axis of rotation thereof. Thus, it is the entire mass of the nacelle that contributes to its positioning, and no longer a secondary additional mass, solid or liquid, to be displaced. FIG. 7 shows the suspended articulated variant and FIG. 8 shows the unstable articulated variant.

"Dynamic" stabilization means with hydraulic jacks, electric jacks or electro-mechanical rack-and-pinion on crown gear systems. One goal is to use a minimum of power to correct the periodic tilt movements of the nacelle with respect to the tower, the nacelle movements being of periodic or aperiodic type with limited angular amplitudes.

It is noted that the axis of rotation of the nacelle can be offset, either forward or backward, with respect to the center of gravity of the nacelle. Indeed, the wind thrust tends to bend the tower in the opposite direction to that of the wind, the axis of rotation of the nacelle can be offset, positioned slightly behind the center of gravity of the nacelle so as to allow the nacelle, in the absence of wind, to tilt naturally under the action of the weight thereof.

The advantages of the present invention can notably be:
the nacelle is a standard one containing the speed multiplier and the generator,
use of the gyroscopic force of the rotation of the blades by the wind in a vertical direction (up or down),
use of the direct or inverted pendular effect depending on the proposed variant,
continuous tilt correction with means requiring little power.

The axis of the rotating shaft of the nacelle is preferably relatively close to the axis of the rotor of the nacelle.

The rotor is the shaft driving the blades, it is generally connected to the speed multiplier and to the generator. The thrust force of the wind on the rotation plane of the blades, whose surface is 10,000 m² for example, is considerable. This wind thrust force is transmitted by the blades to the rotor and to the nacelle. In order to prevent a very high slewing torque produced by the axial thrust force on the rotor over the distance between the rotor axis and the axis of rotation of the nacelle, the distance between the axis of rotation of the nacelle and the rotor axis has to be optimized. In the presence of wind, the thrust force of the wind tends to tilt the tower in the opposite direction to the wind direction and thus to raise the front part of the nacelle. When the nacelle is mobile about its axis of rotation and when, according to the option selected, this axis of rotation is located above the rotor axis, the slewing torque applied by the wind thrust force on the rotor axis tends to lower the front part of the nacelle so as to bring it back along the wind axis.

Axial and radial optimization of the rotation point of the nacelle with respect to its center of gravity and with respect to the axis of rotation of the rotor will reduce the correction efforts to be applied in order to maintain the nacelle horizontal.

The invention claimed is:

1. A wind turbine comprising a nacelle installed on a tower supported by a floating support, characterized in that the nacelle is articulated with respect to said tower in a vertical plane, and in that it comprises means for correcting the nacelle tilt, means for automatically adjusting said correction means in accordance with sensors detecting correction values, said adjustment means being synchronous with the movements of the floating support and said correction means and said adjustment means being configured to maintain the nacelle permanently oriented along the real axis of the wind defined in terms of tilt and azimuth as a function of oscillations of the floating support, the azimuth of the nacelle is automatically maintained, wherein said correction means and said adjustment means comprise a horizontal shaft secured to the tower around which the nacelle is articulated, a first crown portion secured to the nacelle and a second crown portion secured to the tower, a curve of the first crown portion lies over and follows a conforming curve of the second crown portion, the first and second crown portions being relatively displaceable from each other to articulate the nacelle around the horizontal shaft and provide tilt adjustment, the first crown portion comprising a toothed system cooperating with a motorized pinion according to the adjustment means.

2. A wind turbine comprising:
a floating support;
a tower supported by the floating support;
a nacelle installed on the tower by a tilt mechanism configured to adjust a tilt of an axis of the nacelle with respect to horizontal, wherein the tilt mechanism comprises a horizontal shaft secured to the tower around which the nacelle is articulated, a first crown portion secured to the nacelle and a second crown portion secured to the tower, the first and second crown portions being relatively displaceable from each other to articulate the nacelle around the horizontal shaft and provide tilt adjustment, and wherein a curve of the first crown portion lies over and follows a conforming curve of the second crown portion, and the first crown portion comprises a gear teeth system cooperating with a motorized pinion; and
a stabilization system configured to correct the tilt of an axis of the nacelle with respect to horizontal as a function of and synchronous with movements of the floating support and configured to maintain the nacelle permanently oriented along the real axis of the wind defined in terms of tilt and azimuth as a function of oscillations of the floating support.

3. A wind turbine as claimed in claim 2, wherein the stabilization system comprises sensors detecting correction values necessary for the stabilization system to correct the tilt of the axis of the nacelle with respect to horizontal.

* * * * *